UNITED STATES PATENT OFFICE.

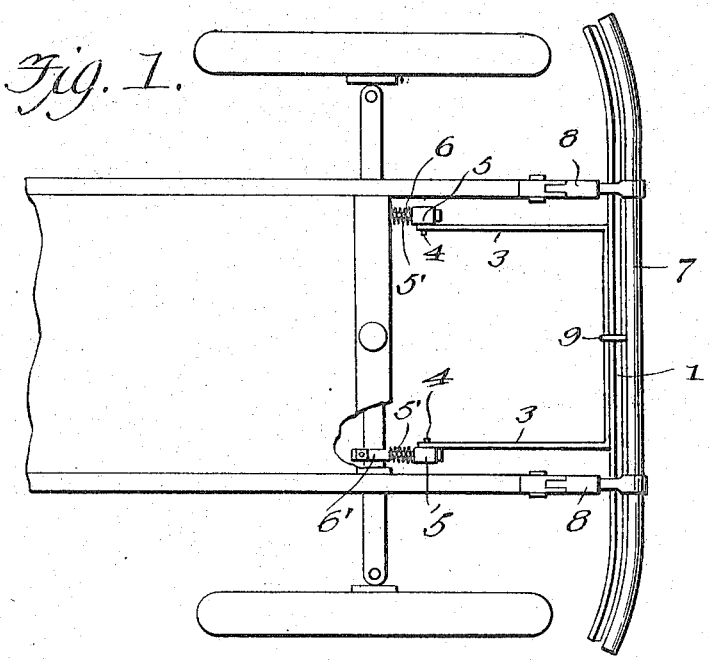
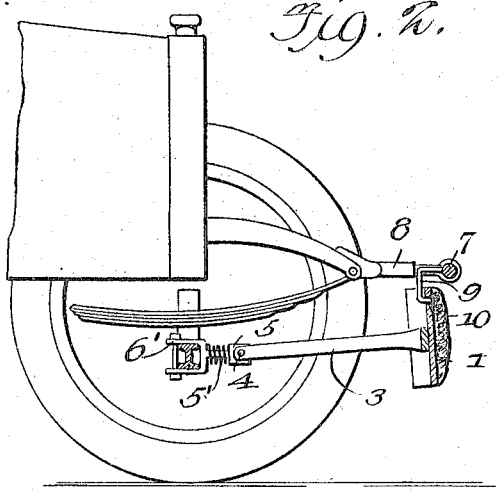
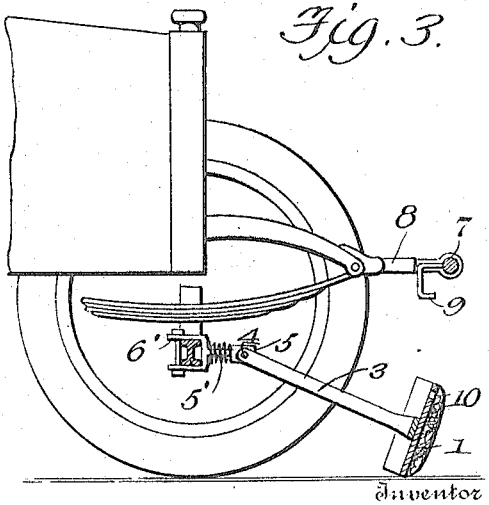
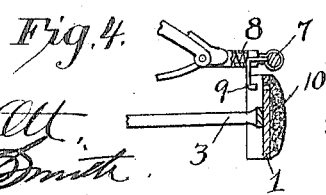

JOHN T. LIVINGSTON, OF STANFORD, KENTUCKY.

FENDER.

1,207,575.

Specification of Letters Patent.

Patented Dec. 5, 1916.

Application filed May 23, 1916. Serial No. 99,372.

*To all whom it may concern:*

Be it known that I, JOHN T. LIVINGSTON, a citizen of the United States, residing at Stanford, in the county of Lincoln and State of Kentucky, have invented new and useful Improvements in Fenders, of which the following is a specification.

This invention relates to fenders especially designed for use upon motor vehicles such as automobiles, motor trucks and the like, the object in view being to produce a fender which may be readily applied to automobiles now in use and which is so combined with the usual bumper rod or guard rail that when a person is struck by said bar or rail, the fender which is normally upheld at a suitable elevation to give the requisite road clearance is temporarily released and dropped close to or in contact with the road surface thereby preventing the person from passing under the wheels and body of the machine and being seriously injured.

With the above and other objects in view, the invention consists in the novel construction, combination and arrangement of parts, as herein described, illustrated and claimed.

In the accompanying drawings, Figure 1 is a plan view of a sufficient portion of an automobile to illustrate the fender in its applied relation thereto. Fig. 2 is a central vertical longitudinal section showing the fender in its raised position. Fig. 3 is a similar view showing the fender in its lowered position. Fig. 4 is a fragmentary section showing the means for permitting rearward movement of the buffer bar.

The fender contemplated in this invention comprises a body 1 substantially rectangular in shape and extending across the front of the vehicle, the fender body being of sufficient length to extend in front of the wheels of the machine so as to prevent a person from being struck by the wheels as well as the front axle and body of the machine. The opposite extremities of the body 1 are preferably curved rearwardly as shown to avoid presenting any sharp corners or edges and to serve as lateral deflecting means to a person who is not squarely in front of the machine.

The body 1 of the fender is supported by means of one or more braces 3 which are fastened to the rear side of the body 1 of the fender and which are journaled at their rear extremities on pins 4 projecting from runners 5 slidable on supporting rods 6 fastened to the front axle by means of clamps 6'. Cushioning springs 5' are arranged behind the runners 5 and disposed around the rods 6' to cushion the fender body 1 when it strikes a person or object.

7 designates the usual bumper rod or guard rail which is yieldingly supported in relation to the hangers 8. It is to be understood that the bar or rail 7 is supported in the usual way by means of springs so that it may yield to a certain extent toward the front of the machine when a person is struck thereby. Secured to the center of the bar or rail 7 is a spring catch or tongue 9 which extends downwardly from the bar 7 and then forwardly, the forwardly extending portion of said catch entering a hole 10 in the body 1 of the fender.

Normally the body of the fender is sustained in the elevated position shown in Fig. 2 by reason of the engagement of the catch 9 with the hole 10 of the fender body. When the bumper bar or guard rail 7 strikes a person, it yields rearwardly thereby pushing the catch 9 out of the hole 10 whereupon the fender body drops upon the road surface and thus prevents the person struck from being carried under the wheels and body of the machine.

I claim:—

The combination with the front axle of an automobile, and a bumper bar supported by the frame of the machine and adapted to yield rearwardly, of a fender body, extending transversely across the front of the machine, arms extending rearwardly from said body and having a fixed relation thereto, supporting rods extending forwardly from the axle, runners slidingly mounted on said rods and provided with laterally projecting pins on which the rear extremities of the fender body arms are journaled, cushioning springs arranged between said runners and axle, and a catch located centrally of said bumper bar for supporting the body of the fender, the latter being formed with a hole to receive the extremity of said catch when the fender body is in its elevated position, said catch being moved out of engagement with the body of the fender when the bumper bar yields rearwardly.

In testimony whereof I affix my signature.

JOHN T. LIVINGSTON.

Attest:
T. J. HILL, Jr.,
W. A. CARSON.

Copies of this patent may be obtained for five cents each, by addressing the "Commissioner of Patents. Washington, D. C."